United States Patent
Byoun et al.

(10) Patent No.: US 7,852,428 B2
(45) Date of Patent: Dec. 14, 2010

(54) LIQUID CRYSTAL DISPLAY

(75) Inventors: Dae Hyoun Byoun, Seoul (KR); Jun Seok An, Suwon-si (KR)

(73) Assignee: Samsung Electronics Co., Ltd, Suwon-si (KR)

(*) Notice: Subject to any disclaimer, the term of this patent is extended or adjusted under 35 U.S.C. 154(b) by 118 days.

(21) Appl. No.: 12/274,394

(22) Filed: Nov. 20, 2008

(65) Prior Publication Data

US 2009/0147172 A1   Jun. 11, 2009

(30) Foreign Application Priority Data

Dec. 7, 2007   (KR) ............... 10-2007-0127119

(51) Int. Cl.
  *G02F 1/1335* (2006.01)
  *G02F 1/1333* (2006.01)
  *G09F 13/04* (2006.01)
(52) U.S. Cl. ............... 349/58; 349/62; 349/64; 362/97.1; 362/97.2
(58) Field of Classification Search ............... 349/67, 349/61, 58, 62, 56, 69, 70, 71, 64, 113; 362/97.1, 362/97.2
  See application file for complete search history.

(56) References Cited

U.S. PATENT DOCUMENTS

| | | | |
|---|---|---|---|
| 5,617,251 A * | 4/1997 | Ohta et al. | 359/599 |
| 6,532,152 B1 * | 3/2003 | White et al. | 361/692 |
| 2005/0270620 A1 * | 12/2005 | Bauer et al. | 359/265 |
| 2007/0058390 A1 * | 3/2007 | Sugawara et al. | 362/560 |
| 2009/0147172 A1 * | 6/2009 | Byoun et al. | 349/58 |
| 2009/0147173 A1 * | 6/2009 | An et al. | 349/58 |

FOREIGN PATENT DOCUMENTS

| | | |
|---|---|---|
| CN | 1716030 | 1/2006 |
| CN | 1910398 | 2/2007 |
| CN | 1916721 | 2/2007 |
| CN | 101019068 | 8/2007 |
| KR | 20070032710 | 3/2007 |

OTHER PUBLICATIONS

Chinese Office Action issued Jan. 29, 2010 in CN Application No. 2008101842586.

* cited by examiner

*Primary Examiner*—Brian M Healy
(74) *Attorney, Agent, or Firm*—Stanzione & Kim LLP (57) ABSTRACT

A liquid crystal display to reduce a number of parts forming a back light unit includes a liquid crystal panel, a light source to illuminate light on the liquid crystal panel, a reflection plate to reflect light emitted from the light source toward the liquid crystal panel, the light source is disposed on the reflection plate, and a support bracket disposed on a rear surface of the reflection plate to reinforce a strength of the reflection plate.

13 Claims, 6 Drawing Sheets

LIQUID CRYSTAL DISPLAY

CROSS-REFERENCE TO RELATED APPLICATIONS

This application claims priority under 35 U.S.C. §119(a) from Korean Patent Application No. 2007-0127119, filed on Dec. 7, 2007 in the Korean Intellectual Property Office, the disclosure of which is incorporated herein in its entirety by reference.

BACKGROUND OF THE INVENTION

1. Field of the Invention

The present general inventive concept relates to a liquid crystal display, and, more particularly, to a liquid crystal display having a reflection plate made of light reflective resin to reduce a number of parts forming a back light unit.

2. Description of the Related Art

A liquid crystal display is a device to display a desired image by controlling light transmittance of liquid crystal cells arranged in a matrix according to image signal information. In the liquid crystal display, light is illuminated onto a liquid crystal panel from a back light unit to form an image on the liquid crystal panel.

The liquid crystal display includes a liquid crystal panel having liquid crystal cells forming unit pixels, and a driving unit to drive the liquid crystal cells, and a back light unit to uniformly supply light to the liquid crystal panel.

The back light unit includes a light source to emit light to be illuminated to the liquid crystal panel, a reflection portion to reflect light emitted from the light source to liquid crystal panel, and an optical sheet to disperse light supplied from the light source and the reflection portion to be uniformly illuminated on the liquid crystal panel.

A rear surface of the back light unit is formed as a lower chassis made of a metal panel. The reflection portion is formed of, for example, a reflective sheet and is received in the lower chassis.

Further, side molds separately formed by injection molding are provided at opposite sides of the lower chassis so as to fixedly support the light source and finish the side surfaces of the lower chassis. Further, reflection plates formed separately are provided at upper and lower portions of the lower chassis so as to direct the light emitted from the light source forward.

As described above, in the conventional liquid crystal display, parts such as a reflection sheet, side molds and a support member to support the light source are separately formed on the lower chassis forming a base of the back light unit and assembled onto the lower chassis.

Accordingly, there is a problem of increasing manufacturing costs of the product due to an increase in a number of the parts forming the back light unit and an assembly process thereof.

SUMMARY OF THE INVENTION

The present general inventive concept provides a liquid crystal display to reduce manufacturing costs by decreasing a number of parts forming a back light unit.

Additional aspects and/or utilities of the present general inventive concept will be set forth in part in the description which follows and, in part, will be obvious from the description, or may be learned by practice of the present general inventive concept.

The foregoing and/or other aspects and utilities of the general inventive concept may be achieved by providing a liquid crystal display including a liquid crystal panel, a light source to illuminate light on the liquid crystal panel, a reflection plate to reflect light emitted from the light source toward the liquid crystal panel, the light source disposed on the reflection plate, and a support bracket disposed on a rear surface of the reflection plate to reinforce a strength of the reflection plate.

The reflection plate may be formed of light reflective resin.

The reflection plate may include a reflection portion having an inclined surface formed at an outer portion of the reflection plate to reflect light emitted from the light source toward the liquid crystal panel.

A lamp holder may be formed on a front surface of the reflection plate to fix the light source.

The light source may be a cathode fluorescence lamp (CFL).

A diffusion plate may be disposed in front of the reflection plate to diffuse light emitted from the light source, and a boss may be formed on a front surface of the reflection plate to support the diffusion plate to be spaced from the light source.

A side mold is formed on the reflection plate to finish a side surface of the reflection plate to prevent light from leaking out.

The side mold may have a receiving groove to fixedly receive the light source.

The reflection plate may include a socket on at least one side of opposite sides of the reflection plate to provide an electrical connection of the light source while supporting the light source.

The socket may include a lamp receiving portion to support the light source and may be formed integrally with the reflection plate, a connection terminal which is connected to an electrode of the light source and a power supply substrate, and a terminal insertion groove into which the connection terminal is fixedly inserted.

The liquid crystal display may include the reflection plate to which the lamps are fixed, wherein the reflection plate is made of light reflective resin. Further, the parts such as side molds, and upper and lower reflection portions, which are separately formed and assembled in the conventional case, are formed integrally with the reflection plate. Accordingly, the number of required parts can be sharply reduced.

Thus, as a number of parts is reduced, the material cost is reduced and an assembly process of the parts can be omitted, thereby reducing the total manufacturing costs of the product.

The foregoing and/or other aspects and utilities of the general inventive concept may also be achieved by providing a liquid crystal display including a liquid crystal panel, a reflection plate to reflect light toward the liquid crystal panel, and at least one of one or more reinforcement ribs and one or more support brackets disposed on a rear surface of the reflection plate to reinforce a strength of the reflection plate.

The foregoing and/or other aspects and utilities of the general inventive concept may also be achieved by providing a liquid crystal display including a liquid crystal panel, a reflection plate to reflect light toward the liquid crystal panel, the reflection plate being formed of a material including a glass fiber and a polycarbonate.

A ratio of the glass fiber to the polycarbonate may be in a range of 10% to 20%.

BRIEF DESCRIPTION OF THE DRAWINGS

These and/or other aspects and utilities of the exemplary embodiments of the present general inventive concept will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Hereinafter, a liquid crystal display according to an embodiment of the present general inventive concept will be described in detail with reference to the accompanying drawings.

Figure 1:
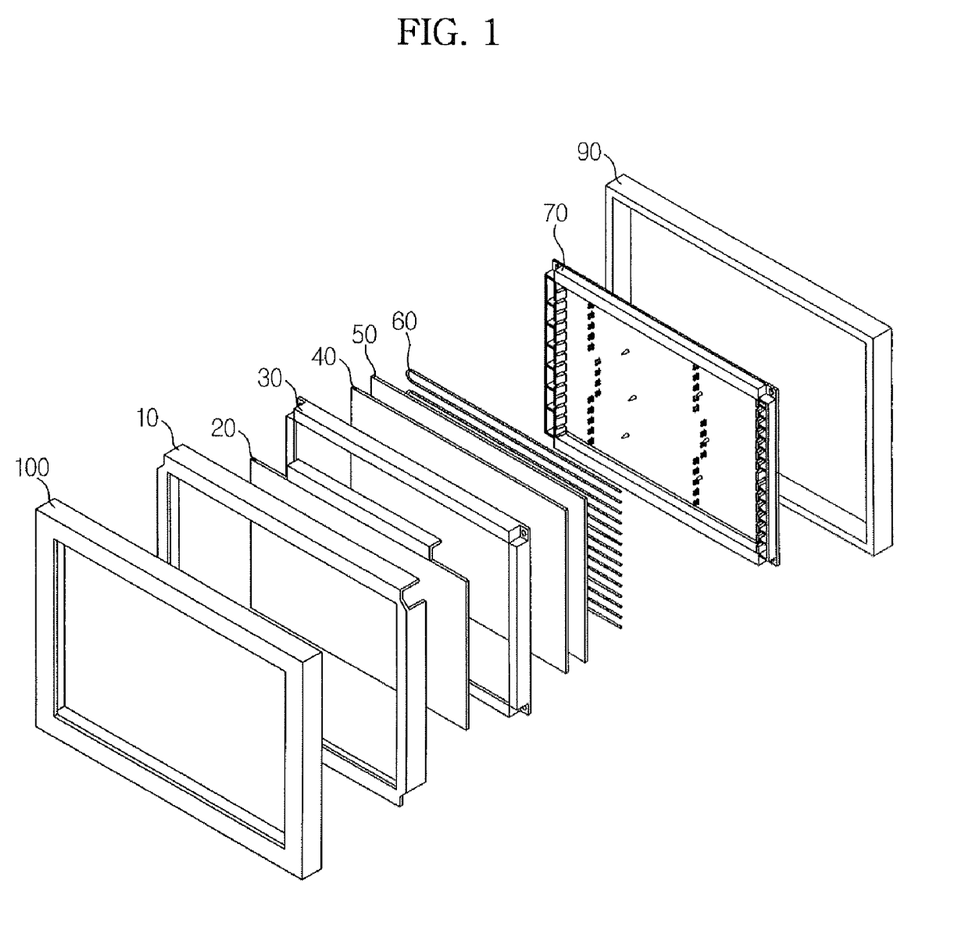
FIG. 1 illustrates an exploded perspective view illustrating a liquid crystal display according to an embodiment of the present general inventive concept.
Figure 2:
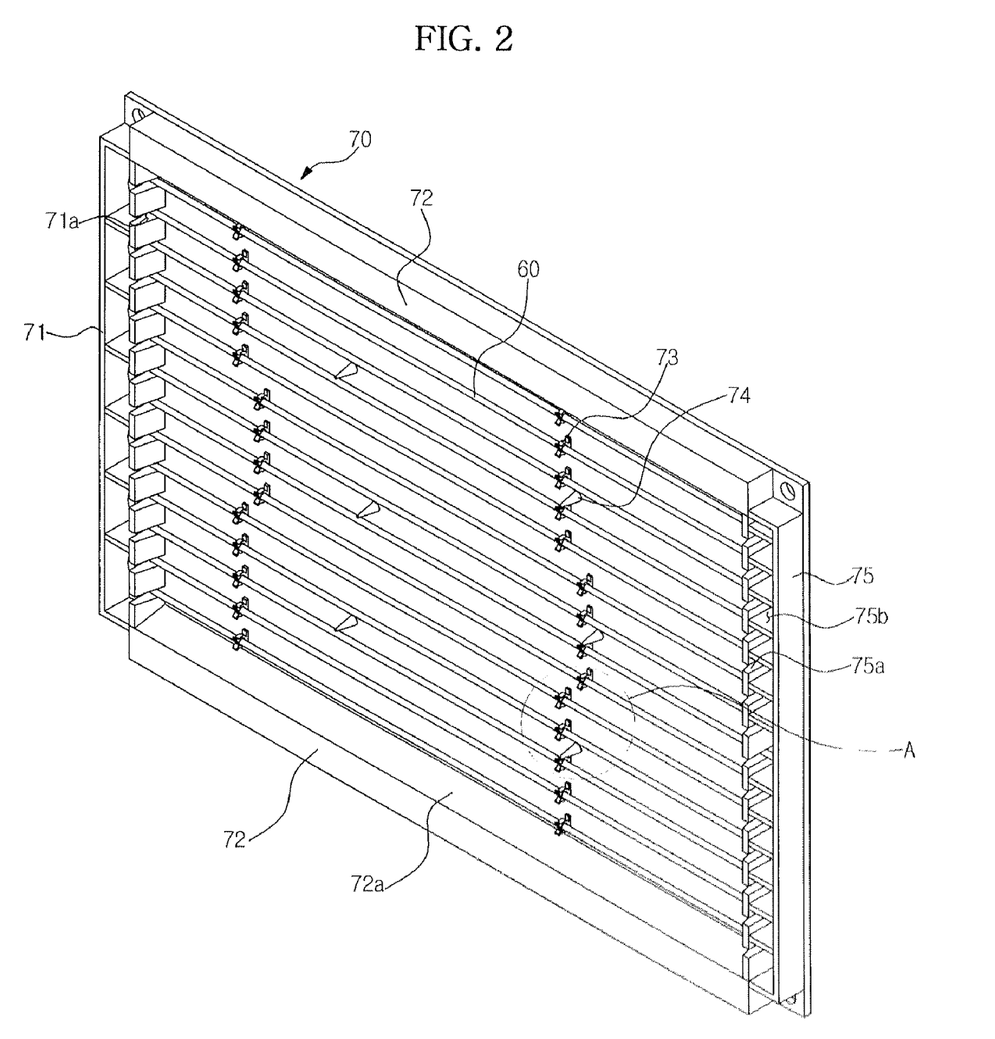
FIG. 2 illustrates a perspective view illustrating a coupling state of a reflection plate and lamps according to an embodiment of the present general inventive concept.

FIG. 1 illustrates an exploded perspective view illustrating a liquid crystal display according to the embodiment of the present general inventive concept. FIG. 2 illustrates a perspective view illustrating a coupling state of a lower chassis and lamps according to an embodiment of the present general inventive concept.

Referring to FIGS. 1 and 2, the liquid crystal display includes a liquid crystal panel 20 to form an image, optical films 40 and 50 disposed on a rear surface of the liquid crystal panel 20, a light source 60, such as lamps, to illuminate light on the liquid crystal panel 20, and a reflection plate 70 disposed at a rear side of the light source 60.

The liquid crystal panel 20 includes a thin film transistor (TFT) substrate and a color filter facing each other, and a liquid crystal layer formed therebetween. Since the liquid crystal panel 20 is a non-luminous element incapable of emitting light, lamps 60 serving as a light source are provided at the rear of the liquid crystal panel 20 to illuminate light on the liquid crystal panel 20, thereby forming an image. In this case, the liquid crystal panel 20 controls transmittance of light illuminated from the light source to form an image on a surface thereof.

In this embodiment, cathode fluorescence lamps (CFL) are provided as a light source. A plurality of U-shaped lamps 60 are arranged on an entire rear surface of the liquid crystal panel 20.

The optical films 40 and 50 provided at a front of the lamps 60 include a diffusion plate 50 and an optical sheet 40. The diffusion plate 50 diffuses the light emitted from the light source to supply the light uniformly onto the entire liquid crystal panel 20.

The optical sheet 40 collects the light diffused from the diffusion plate 50 and aligns the direction of light such that the light is projected perpendicularly onto the surface of the liquid crystal panel 20. The optical sheet 40 may include a Fresnel lens and a protection film to protect the Fresnel lens.

A middle mold 30 is disposed between the liquid crystal panel 20 and the optical films 40 and 50. An upper chassis 10 is disposed at the front of the liquid crystal panel 20. Accordingly, the liquid crystal panel 20 is supported between the upper chassis 10 and the middle mold 30.

The reflection plate 70 forms the rear surface of the liquid crystal display. Further, the reflection plate 70 is made of light reflective resin having high reflectivity to illuminate light emitted from the light source to the liquid crystal panel 20.

Further, the reflection plate 70 is produced by injection molding using a material obtained by adding glass fiber to polycarbonate. When glass fiber is added to polycarbonate, the thermal expansion coefficient of the obtained injection molded product is reduced and thus the thermal deformation of the reflection plate 70 is reduced. Injection molding characteristics become excellent, and thus generation of troubles in the injection molding is reduced. Further, rigidity of the reflection plate 70 is enhanced, and thus preventing the reflection plate 70 from being deformed or components mounted in the reflection plate 70 is possible from being broken due to an external impact.

A ratio of glass fiber added to polycarbonate is 10~20%. When a rate of glass fiber added to polycarbonate is below 10%, an effect of glass fiber added to polycarbonate is insignificant, and when the rate of glass fiber added to polycarbonate is above 20%, mass productivity in injection molding is lowered.

A rear cover 90 is disposed at a rear of the reflection plate 70. A front cover 100 coupled to the rear cover 90 may be disposed at a front of the upper chassis 10.

The lamps 60 serving as a light source are disposed on a front surface of the reflection plate 70. Side molds 71 and 75 are formed on opposite side surfaces of the reflection plate 70. The side molds 71 and 75 have receiving grooves 71a and 75a, respectively, to receive and support opposite end portions of the lamps 60.

The side molds 71 and 75 include a first side mold 71 positioned at a left side of the reflection plate 70, and a second side mold 75 positioned at a right side of the reflection plate 70 to face the first side mold 71. The side molds 71 and 75 are formed to protrude forward by a specific height to support the diffusion plate 50 such that the lamps 60 are spaced from the diffusion plate 50. Further, the side molds 71 and 75 form reflective surfaces to prevent light emitted from the lamps 60 from leaking to the outside. Similarly to the side molds 71 and 75, reflection portions 72 having inclined surfaces 72a are formed on upper and lower portions of the reflection plate 70 to reflect light emitted from the light source.

Figure 3:
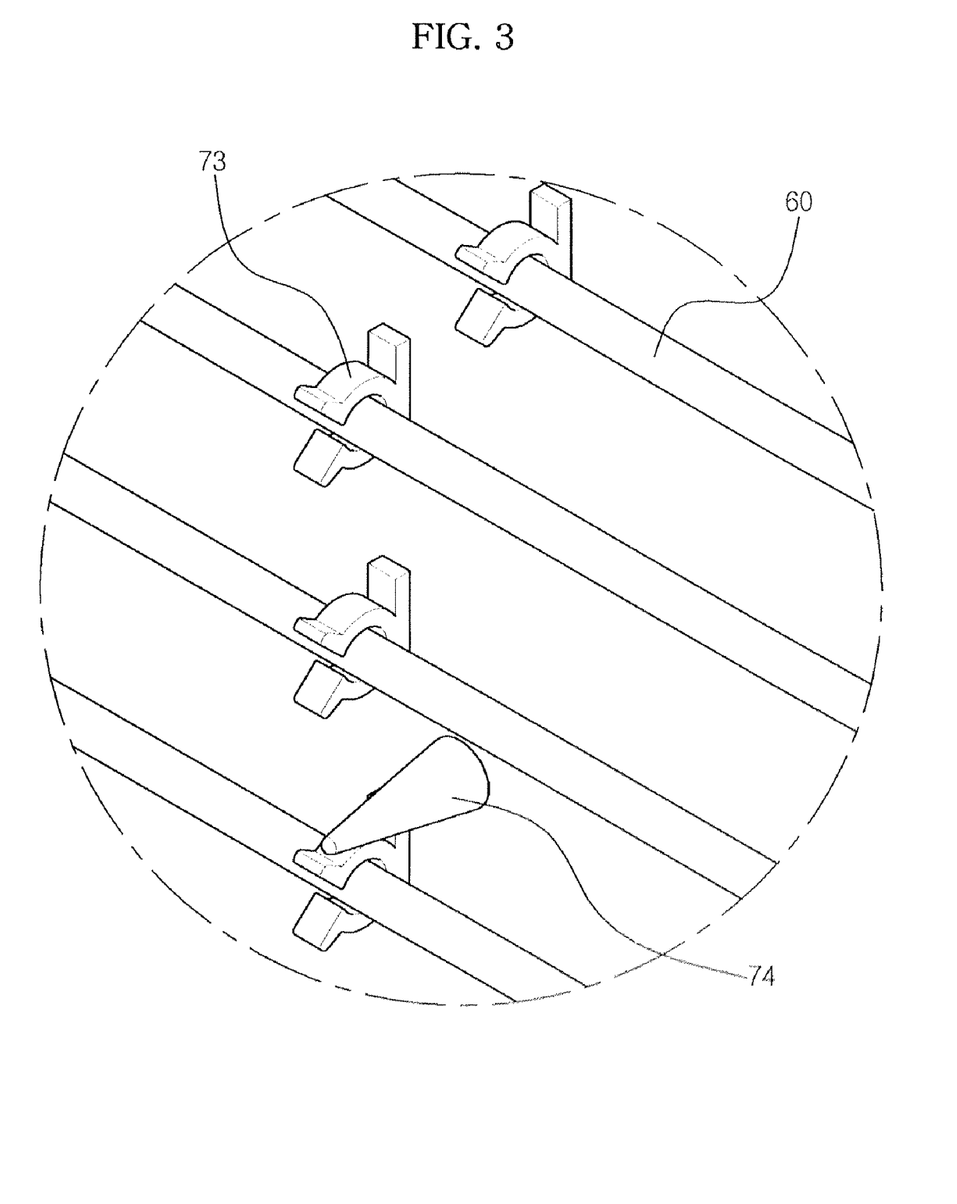
FIG. 3 illustrates an enlarged view illustrating a portion indicated by a circle A illustrated in FIG. 2.

FIG. 3 illustrates an enlarged view illustrating a portion indicated by a circle A illustrated in FIG. 2. As illustrated in FIG. 3, a number of lamp holders 73 and bosses 74 are formed on the front surface of the reflection plate 70. The lamp holders 73 are formed to cover the lamps 60 such that the lamps 60 are spaced from the front surface of the reflection plate 70 and are supported against an external impact.

The bosses 74 support the diffusion plate 50 and the optical sheet 40. The bosses 74 are formed to be protruded from the front surface of the lower chassis by a specific height. Outer portions of the diffusion plate 50 and the optical sheet 40 are supported by the side molds 71 and 75 and the reflection portions 72. Also, central portions apart from the side molds 71 and 75 and the reflection portions 72 are supported by the bosses 74.

The bosses 74, for example, are formed to have a same height as the side molds 71 and 75 and the reflection portions 72.

Figure 4:
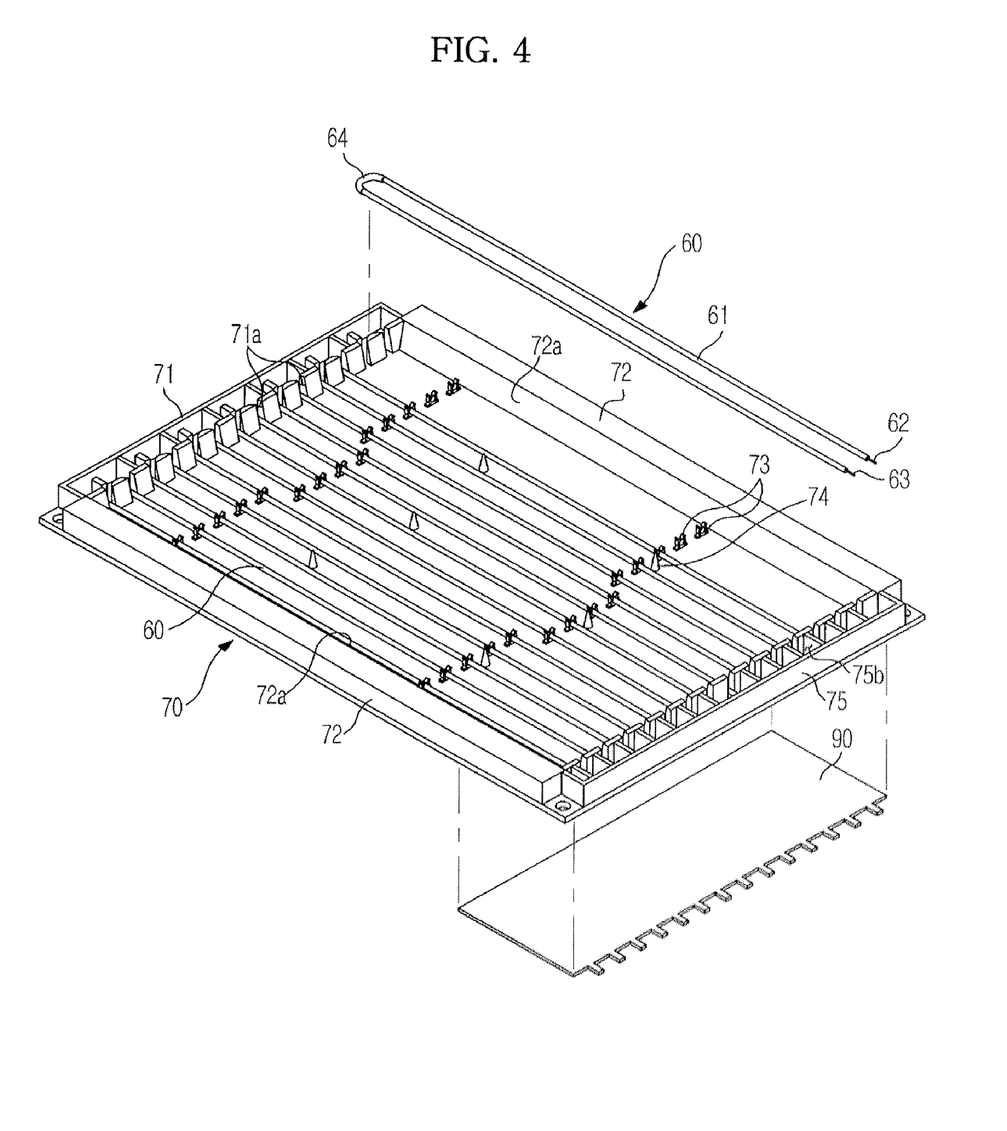
FIG. 4 illustrates an exploded perspective view illustrating the reflection plate and lamps of FIG. 1.

As illustrated in FIG. 4, the lamps 60 are arranged in parallel on the front surface of the reflection plate 70. Each of the lamps 60 includes a lamp body 61, and a first electrode 62 and a second electrode 63 provided at ends of the lamp body 61. In this embodiment, U-shaped lamps are used as the lamps 60. Accordingly, the lamp body 61 has a bent portion 64 bent in a U shape. The bent portion 64 is received in the first side mold 71. The first electrode 62 and the second electrode 63 adjacent to each other are disposed at the second side mold 75 facing the first side mold 71 in which the bent portion 64 is received.

Figure 5:
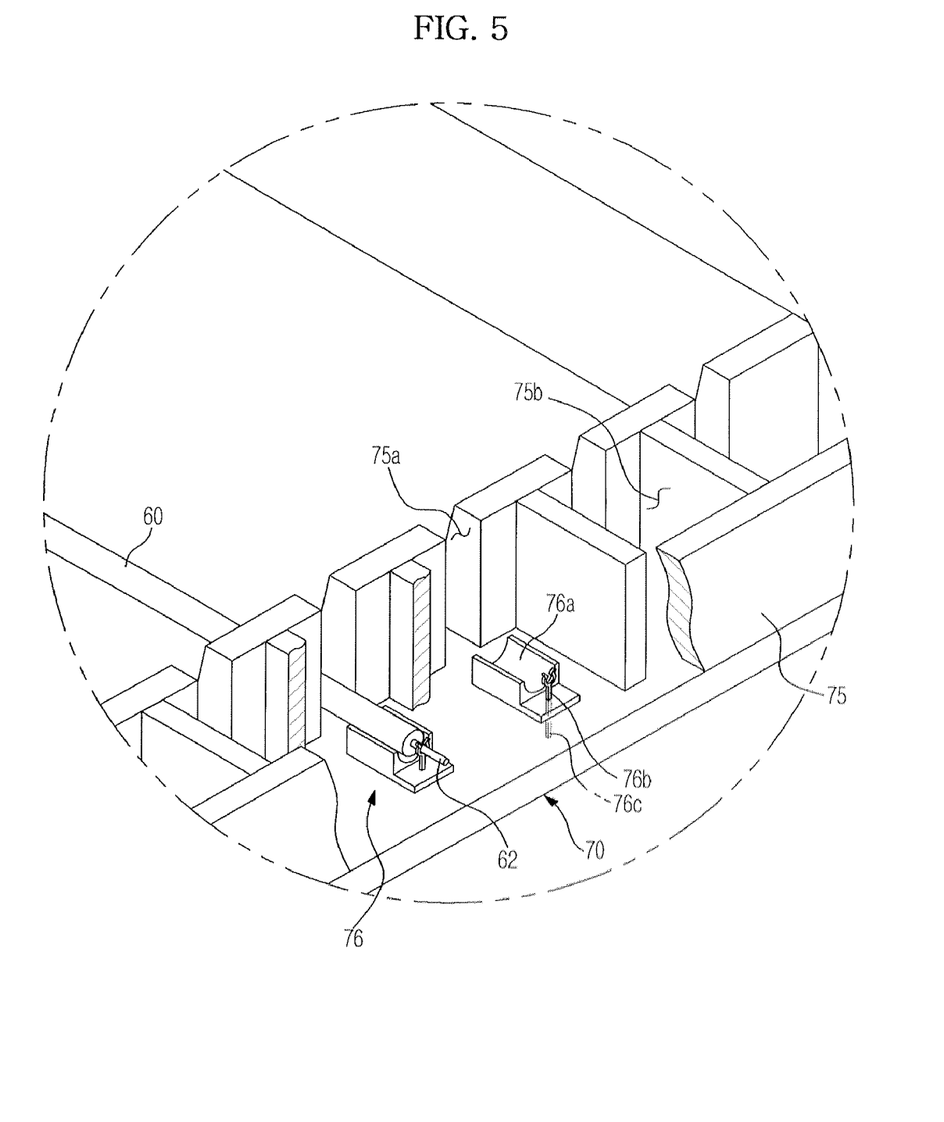
FIG. 5 illustrates an enlarged view illustrating a connection structure of a first electrode and a second electrode according to an embodiment of the present general inventive concept.

FIG. 5 illustrates an enlarged view illustrating a connection structure of the first electrode 62 and the second electrode 63 (FIG. 4).

As illustrated in FIGS. 4 and 5, sockets 76 are provided in a lamp receiving space 75b of the second side mold 75 and are formed integrally with the reflection plate 70.

The sockets 76 are coupled to the lamps 60 to support the lamps 60. Each of the sockets 76 includes a lamp receiving portion 76a to receive and support an end portion of the lamp 60, a connection terminal 76b which is connected to the first electrode 62 or the second electrode 63 of the lamp 60, and a terminal insertion groove 76c into which the connection terminal 76b is fixedly inserted.

The connection terminal 76b may be formed as a conductor for electrical connection. The connection terminal 76b is disposed at the socket 76 while a portion of the connection terminal 76b is inserted into the terminal insertion groove 76c. One side of the connection terminal 76b is protruded adjacent to the lamp receiving portion 76a and is coupled to the first electrode 62 or the second electrode 63 of the lamp 60. Accordingly, the connection terminal 76b is electrically connected to the lamp 60. One end of the connection terminal 76b, coupled to the first electrode 62 or the second electrode 63, is formed in a ring shape having an open portion to facilitate fixation of the first electrode 62 or the second electrode 63. Further, an other end of the connection terminal 76b serving as a terminal is electrically connected to a power supply substrate 90.

The power supply substrate 90 is disposed on the rear surface of the reflection plate 70. The power supply substrate 90 converts an external power into a driving power to drive the lamps 60 and applies a driving voltage to the lamps 60.

Meanwhile, although the connection terminal 76b is disposed through the terminal insertion groove 76c in the illustrated embodiment, the connection terminal 76b may be fixed to the socket 76 by insert injection molding in the injection molding operation of the reflection plate 70.

Figure 6:
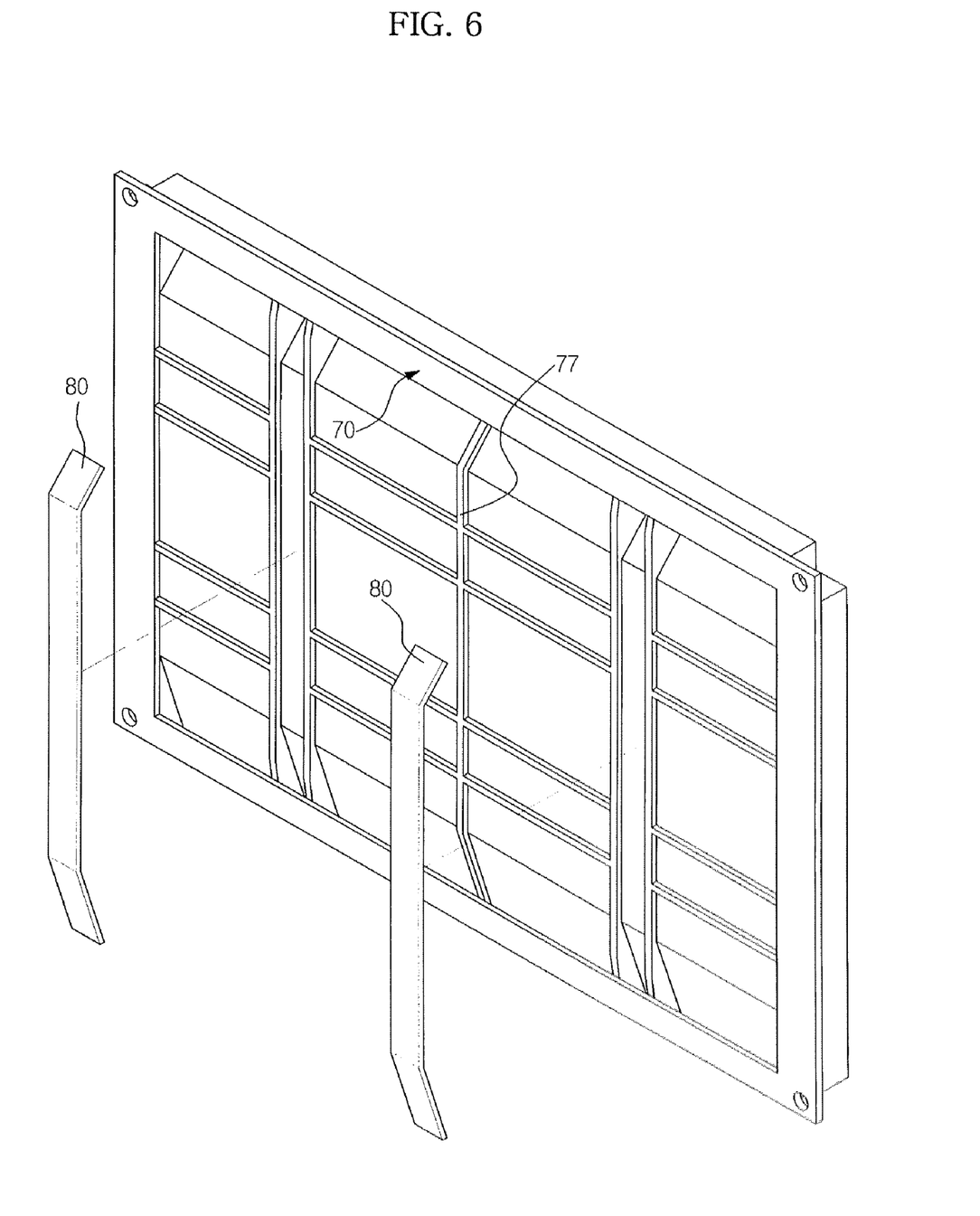
FIG. 6 illustrates a perspective view illustrating support brackets disposed on a rear surface of a reflection plate according to an embodiment of the present general inventive concept.

Referring to FIG. 6, support brackets 80 are disposed on the rear surface of the reflection plate 70 to provide a reinforced strength to the reflection plate 70. The support brackets 80 are provided to reinforce the strength of the reflection plate 70, which may not have sufficient strength alone to support the parts of the liquid crystal display.

As described above, since the reflection plate 70 is formed of light reflective resin, the reflection plate 70 may have lower structural strength than a metal panel having a same thickness. Particularly, in a case of decreasing a thickness of the reflection plate 70 to reduce the material cost or a thickness of the liquid crystal display, or in a case of manufacturing a large-sized reflection plate for a large-sized liquid crystal display, the reflection plate 70 may not have sufficient structural strength. In such cases, the support brackets 80 may be disposed to reinforce the strength of the reflection plate 70 having insufficient structural strength.

In the illustrated embodiment, a number of bar-shaped support brackets 80 may be disposed on the rear surface of the reflection plate 70 in a vertical direction. The support brackets 80 may be assembled to the reflection plate 70 by fastening screws or using hooks or the like.

Reinforcement ribs 77 may be formed on the rear surface of the reflection plate 70 to reinforce a structural strength thereof. As illustrated in FIG. 6, both the reinforcement ribs 77 and the support brackets 80 may reinforce the strength of the reflection plate 70. However, only the reinforcement ribs 77 may be provided as a reinforcement structure without the support brackets 80.

The support brackets 80 may have various shapes with regard to a size of the reflection plate 70, a structure of the reinforcement ribs 77, and the like.

Further, a driving unit (not illustrated) to drive the liquid crystal panel 20 may be mounted on the rear surface of the reflection plate 70 in a form of a substrate. When the driving unit is assembled onto the rear surface of the reflection plate 70, the driving unit may be coupled to the support brackets 80 such that the driving unit can be stably assembled compared to when the driving unit is coupled to the reflection plate 70.

As described above, the reflection plate 70 is formed of light reflective resin with high reflectivity to form a reflection structure. In addition, although the side molds, the reflection portions having inclined surfaces, the bosses, and the like are separately formed and disposed through an assembly process in the conventional case, they are formed integrally with the reflection plate according to the present general inventive concept. Accordingly, a number of parts forming a back light unit can be sharply reduced.

Meanwhile, since the reflection plate 70 is formed of light reflective resin serving as a nonconductor, when the driving unit (not illustrated) having a driving circuit to drive the liquid crystal panel 20 is disposed on the rear surface of the reflection plate 70, the short circuit does not occur. Accordingly, the driving unit can be mounted on the reflection plate 70 without a spacing distance from the reflection plate 70 or with a smaller spacing distance than the conventional case. Thus, reducing an entire thickness of the product is possible.

In the above-described embodiment, the reflection plate made of light reflective resin is applied to the liquid crystal display including a direct-type back light assembly having light sources uniformly arranged at the rear of the liquid crystal panel 20. However, the present general inventive concept is not limited thereto. That is, the reflection plate made of light reflective resin may be also applied to a liquid crystal display including a wedge-type back light assembly having a light source disposed at one side of the reflection plate or a side-type back light assembly having light sources disposed at the opposite sides of the reflection plate.

Although various embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. A liquid crystal display, comprising:
a liquid crystal panel;
a light source to illuminate light on the liquid crystal panel;

a reflection plate to reflect light emitted from the light source toward the liquid crystal panel, the light source is disposed on the reflection plate; and a support bracket disposed on a rear surface of the reflection plate to reinforce a strength of the reflection plate, wherein a diffusion plate is disposed in front of the reflection plate to diffuse light emitted from the light source, and a boss is formed on a front surface of the reflection plate to support the diffusion plate to be spaced from the light source.

2. The liquid crystal display according to claim 1, wherein the reflection plate is formed of a light reflective resin.

3. The liquid crystal display according to claim 1, wherein the reflection plate comprises:

a reflection portion having an inclined surface formed at an outer portion of the reflection plate to reflect light emitted from the light source toward the liquid crystal panel.

4. The liquid crystal display according to claim 1, wherein a lamp holder is formed on a front surface of the reflection plate to fix the light source.

5. The liquid crystal display according to claim 1, wherein the light source comprises:

a cathode fluorescence lamp (CFL).

6. A liquid crystal display, comprising:

a liquid crystal panel;

a light source to illuminate light on the liquid crystal panel;

a reflection plate to reflect light emitted from the light source toward the liquid crystal panel, the light source is disposed on the reflection plate; and a support bracket disposed on a rear surface of the reflection plate to reinforce a strength of the reflection plate, wherein a side mold is formed on the reflection plate to finish a side surface of the reflection plate to prevent light from leaking out, and wherein the side mold has a receiving groove to fixedly receive the light source.

7. A liquid crystal display, comprising:

a liquid crystal panel;

a light source to illuminate light on the liquid crystal panel;

a reflection plate to reflect light emitted from the light source toward the liquid crystal panel, the light source is disposed on the reflection plate; and a support bracket disposed on a rear surface of the reflection plate to reinforce a strength of the reflection plate, wherein the reflection plate includes a socket on at least one side of opposite sides of the reflection plate to provide an electrical connection of the light source while supporting the light source, wherein the socket comprises:

a lamp receiving portion to support the light source and is formed integrally with the reflection plate;

a connection terminal which is connected to an electrode of the light source and a power supply substrate; and a terminal insertion groove into which the connection terminal is fixedly inserted.

8. A liquid crystal display, comprising:

a liquid crystal panel;

a light source to illuminate light on the liquid crystal panel;

a reflection plate to reflect light emitted from the light source toward the liquid crystal panel, the light source is disposed on the reflection plate; and a support bracket disposed on a rear surface of the reflection plate to reinforce a strength of the reflection plate, wherein the reflection plate is formed of a material including a glass fiber and a polycarbonate.

9. The liquid crystal display according to claim 8, wherein a ratio of the glass fiber to the polycarbonate is in a range of 10% to 20%.

10. A liquid crystal display, comprising:

a liquid crystal panel;

a reflection plate to reflect light toward the liquid crystal panel, the reflection plate being formed of a material including a glass fiber and a polycarbonate; and at least one of one or more reinforcement ribs and one or more support brackets disposed on a rear surface of the reflection plate to reinforce a strength of the reflection plate.

11. A liquid crystal display, comprising:

a liquid crystal panel;

a reflection plate to reflect light toward the liquid crystal panel; and at least one of one or more reinforcement ribs and one or more support brackets disposed on a rear surface of the reflection plate to reinforce a strength of the reflection plate, wherein a diffusion plate is disposed in front of the reflection plate to diffuse light, and a boss is formed on a front surface of the reflection plate to support the diffusion plate.

12. A liquid crystal display, comprising:

a liquid crystal panel;

a reflection plate to reflect light toward the liquid crystal panel; and at least one of one or more reinforcement ribs and one or more support brackets disposed on a rear surface of the reflection plate to reinforce a strength of the reflection plate, wherein a side mold is formed on the reflection plate to finish a side surface of the reflection plate to prevent light from leaking out, and wherein the side mold has a receiving groove to fixedly receive a light source.

13. A liquid crystal display, comprising:

a liquid crystal panel;

a reflection plate to reflect light toward the liquid crystal panel; and at least one of one or more reinforcement ribs and one or more support brackets disposed on a rear surface of the reflection plate to reinforce a strength of the reflection plate, wherein the reflection plate includes a socket on at least one side of opposite sides of the reflection plate to provide an electrical connection for a light source while supporting the light source, wherein the socket comprises:

a lamp receiving portion to support the light source and is formed integrally with the reflection plate;

a connection terminal which is connected to an electrode of the light source and a power supply substrate; and a terminal insertion groove into which the connection terminal is fixedly inserted.

* * * * *